United States Patent [19]

Chelland et al.

[11] 4,012,348
[45] Mar. 15, 1977

[54] METHOD OF PREPARING A MIXTURE FOR MAKING EXTRUDED RESIN ARTICLES

[75] Inventors: Joseph John Chelland, Littleton; Fred Everett Love, Denver, both of Colo.

[73] Assignee: Johns-Manville Corporation, Denver, Colo.

[22] Filed: Nov. 29, 1974

[21] Appl. No.: 528,111

[52] U.S. Cl. .................... 260/28.5 R; 260/42.56; 260/42.57; 260/27 R; 264/40.7; 264/121; 264/122; 264/211; 264/349; 526/1

[51] Int. Cl.² .................... C08L 91/00; C08J 3/20

[58] Field of Search ............ 264/122, 40, 121, 211, 264/349; 260/42.56, 42.57, 27 R, 28.5; 526/1

[56] References Cited

UNITED STATES PATENTS

| | | | |
|---|---|---|---|
| 3,334,163 | 8/1967 | Gilbert | 264/122 |
| 3,616,149 | 10/1971 | Winckhofer | 264/122 |
| 3,716,609 | 2/1973 | Trocciola et al. | 264/122 |

Primary Examiner—Robert F. White
Assistant Examiner—James R. Hall
Attorney, Agent, or Firm—Robert M. Krone; Joseph J. Kelly; Stephen C. Shear

[57] ABSTRACT

A mixture to be used in making an extruded resin article, specifically extruded polyvinyl chloride pipe, and a method of preparing this mixture are disclosed herein. The mixture includes a resin, specifically polyvinyl chloride (PVC), in particulate form and a non-resinous filler material, for example, calcium carbonate, also in particulate form dispersed throughout the PVC. The particles of filler material are adhered to adjacent PVC particles to reduce segregation of the two types of particles. The method by which these particles are adhered to each other includes the use of a second resin which is also in particulate form and which has a lower melting point than that of the PVC resin.

10 Claims, 1 Drawing Figure

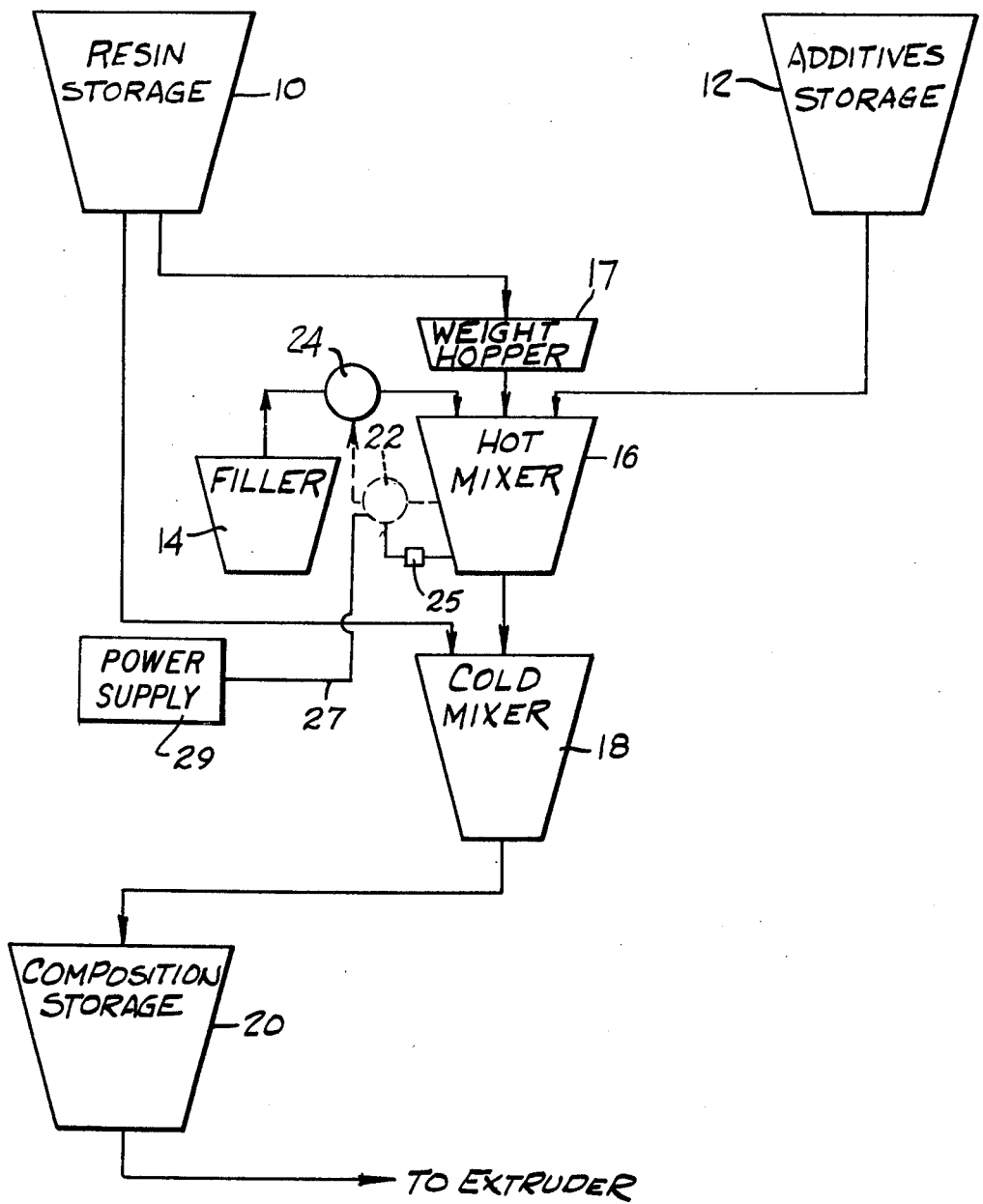

METHOD OF PREPARING A MIXTURE FOR MAKING EXTRUDED RESIN ARTICLES

BACKGROUND OF THE INVENTION

The present invention relates generally to a method of making extruded resin articles, and a method of preparing a mixture to be used in making extruded PVC pipe.

For many years the pipe industry has used plastic, particularly polyvinyl chloride, in making pipe for pressure service, sewer service, telephone service, as well as for other intended uses. A common and well developed way of making PVC pipe is by means of extrusion. Generally, this process includes preparing a blend or mixture including PVC in particulate or powdered form and various additives, such as extrusion stabilizers, processing aids, and lubricants, also in particulate or powdered form. This mixture is normally prepared at a location which is remote of the extruder and conveyed to the extruder via one or more storage points. A typical method of conveying this mixture is by means of air transfer. The mixture is ultimately deposited into the extruder where the PVC is worked by one or more extrusion screws to fuse into the final product, such as a pipe.

During the original development of extruded PVC pipe, it became apparent that a substantially pure polyvinyl chloride pipe having satisfactory physical characteristics for its intended use could be extruded with the only exception being the ultilization of very small amounts of PVC stabilizers, extrusion processing aids such as fusion promoters and lubricants, and substances to improve the physicals of the ultimately produced pipe. Because of these capabilities coupled with the fact that at that time PVC resin was relatively inexpensive, most extruded PVC pipes were substantially pure PVC with, of course, small amounts of the additives just recited.

In the recent past, as a result of the apparent oil shortage, the polyvinyl chloride resin as well as other resins started to increase in price and became less available. This trend has continued causing various pipe manufacturers to initiate development of means to "extend" the use of PVC in their pipes, i.e., to provide a pipe which is as satisfactory for its intended use as a substantially pure PVC pipe but one which includes less PVC in combination with a lesser expensive filler material. One known extender of PVC resin is calcium carbonate which heretofore has typically been initially loosely mixed with the PVC resin, in particulate form, and conveyed along with the PVC mixture from point to point and eventually deposited into the extruder.

In order to be compatible with the extrusion process and to minimize the production of extruded pipe with adverse physical characteristics, it has been found that the calcium carbonate or, for that matter, other materials used to extend the PVC must be very fine, actually much finer than the PVC particles. As a result, when the PVC mixture including the much finer calcium carbonate or other filler is air-conveyed from the point at which the mixture is initially prepared to various storage points and finally to the extruder, a number of specific problems arise due to the filler segregating out from the PVC mixture. First, much of the finer calcium carbonate particles form a dust cloud as a result of the turbulence caused by the air conveyance system creating a dust conditon in the air around the open junctures at, for example, the various storage locations or, for example, at the point where the mixture is deposited into the extruder. This, of course, is quite annoying to the operators in the direct vicinity and, further, results in an annoying maintenance problem. Second, this cloud of calcium carbonate tends to settle on the internal surfaces of, for example, a storage container causing the mixture being fed to the extruder to have less filler, i.e., calcium carbonate, than it should. After a fairly large build-up of this calcium carbonate within the container wall, it has been found to eventually break away, falling into the PVC mixture and thus causing too much calcium carbonate to be fed to the extruder along with the PVC and additives which, in turn, results in process problems such as, for example, loss of melt strength. In addition to these problems, the clouds of calcium carbonate tend to also adhere to vacuum filters within the storage containers. This requires the filters to be cleaned or changed at shorter intervals than would be the case if the mixture did not include the fine filler particles.

As will be discussed in more detail hereinafter, Applicants have discovered a way to combine the PVC or other resin comprising the major constituent of the mixture with calcium carbonate or other such PVC extender to be used in the mixture to substantially minimize, if not eliminate, the aforediscussed problems. Applicants' resultant mixture is one which includes, for example, PVC resin and calcium carbonate or other such extender in fine powder form. However, this mixture reduces substantially the dust problem, material segregation problem, and filter maintenance problem of the types discussed above.

BRIEF SUMMARY OF THE INVENTION

An object of the present invention to provide an improved method of preparing a mixture of materials to be used, for example, in making an extruded resin article, specifically an extruded polyvinyl chloride pipe, which mixture includes both a resin and a non-resinous filler.

In accordance with one aspect of the present invention, a mixture to be used to make an extruded resin article, specifically an extruded polyvinyl chloride pipe, is disclosed and claimed herein. This mixture includes as its main constituent a resin, for example, polyvinyl chloride, in particulate form and a nonresinous filler material, for example, calcium carbonate, also in particulate form. The particulate filler material, which in most cases is much finer than the PVC, is dispersed throughout the polyvinyl chloride particles and adhered to adjacent ones of the polyvinyl chloride particles so that in the event that the mixture is conveyed from one point to another by, for example, air prior to the actual manufacture of the article from the mixture, the filler material remains substantially uniformly dispersed throughout the resin particles. This reduces the dust, segregation, and filter maintenance problems discussed above.

Adherence of the filler material to the primary resin material, for example, the polyvinyl chloride particles, is attained by providing a resinous material, also in particulate form, which material (1) has a melting point below that of the primary resin material, (2) when initially heated to its melting point, will adhere to adjacent resin particles and adjacent filler particles but will not immediately be absorbed by these adjacent particles, and (3) acts as a processing aid during the extrusion of the primary resin.

The two resin materials are mixed together to provide a substantially uniform mixture of the two, in the absence of the filler material. As these two resin materials are mixed, the resin additive is heated to the point at which it initially melts such that the individual particles making up this additive adhere to adjacent particles of the primary resin, for example, the polyvinyl chloride. After the resin additive has reached the melting point and before it has a chance to be absorbed by the primary resin particles, the filler material is dispersed throughout the mixture such that the particles of filler material adhere to the melted particles of resin additive and therefore to the particles making up the primary resin.

After the filler material has been added to and dispersed throughout the mixture so as to adhere to the primary resin particles by means of the resin additive, it is preferable that further melting of the additive be prevented so that the additive is not absorbed. This is preferably accomplished by adding a sufficient amount of the filler material to the mixture of primary resin particles and resin additive to cool down the particles of resin additive before they have a chance to be absorbed. The resulting mixture is one which includes particles of filler material dispersed substantially uniformly throughout the primary resin particles, for example, the polyvinyl chloride particles, such that the filler particles are adhered to adjacent primary resin particles by means of the resin additive.

BRIEF DESCRIPTION OF THE DRAWING

The sole FIGURE illustrated, is a schematic flow diagram of a process according to the present invention for preparing a mixture according to the present invention, which mixture is to be used to make a resin article, specifically an extruded polyvinyl chloride pipe.

DETAILED DESCRIPTION AND PREFERRED EMBODIMENTS

The drawing is a flow diagram which represents a portion of a process for manufacturing extruded polyvinyl chloride pipe. The portion actually illustrated is the pre-extrusion process during which polyvinyl chloride resin, in particulate form, is mixed with various process and product additives in preparing the ultimate mixture to be extruded and the various stages during preparation of this mixture. One of the additives included in the mixture, which will be referred to as a PVC mixture since polyvinyl chloride is its major constituent, is a filler material. The primary function of this filler material is to reduce the amount of polyvinyl chloride required in making the pipe, i.e., as a "PVC extender." As a practical matter, the filler or extender is one which is less costly than the PVC so as to reduce the ultimate cost in making the pipe by utilizing less PVC resin.

Before discussing Applicants' pre-extrusion process, attention is briefly directed to a conventional pre-extrusion process presently being used in the manufacture of extruded PVC pipe, using portions of FIG. 1 in illustrating this process. In this conventional process, PVC resin is furnished in particulate form, the particles making up the resin ranging in size from, for example, 60 microns to 200 microns in size and stored in, for example, a storage bin 10. As stated previously, various extrusion process aids and ultimate product aids are added to the resin along with the filler just discussed to provide the ultimate mixture which is used in making the extruded product. Since the PVC is the major constituent making up this mixture, the mixture will hereinafter be referred to as a PVC mixture.

Conventional additives, which may be initially stored separately from the PVC resin in, for example, storage bin 12, include, for example, a PVC stabilizer (for example, butyl tin mercaptide) which prevents the PVC from burning up or otherwise being damaged during extrusion. Another additive is a conventional processing aid, for example, one sold by Rohm and Hass under the name K120, which promotes fusion of the PVC during extrusion and which improves hot strength of the PVC directly following extrusion. Other additives include both internal and external lubricants, for example, low-melting-point and high-melting-point waxes which, of course, are also processing aids, and ultimate product aids such as, for example, chlorinated polyethylene, to improve the impact strength of the ultimate product, titanium dioxide used to reduce the deleterious effects of sunlight on the ultimate product, and coloring agents. It is to be understood that the present invention is not directed per se to the various additives required in the PVC resin mixture to satisfactorily extrude the mixture or to provide a satisfactory extruded pipe. Those individuals skilled in the art can readily determine which additives are necessary and the amounts required.

As also stated previously, the PVC mixture may include a filler or resin extender. A typical filler and one which has been used heretofore in extruded PVC pipe is calcium carbonate. A specific calcium carbonate used in one sold by Pleuss and Stauffer under the trade name Omya 90T. This calcium carbonate filler, like the PVC resin, is furnished in particulate form. However, the filler is substantially finer than the PVC resin, the filler particles ranging in size between, for example, 0.5 microns and 3.5 microns, i.e., substantially smaller than the smallest PVC particles. In this regard, in most cases it has been found necessary to provide filler in extremely small particle size, for example, less than 1 micron. The small size is important in maximizing surface area, which minimizes deterioration of the pipe's physical properties and minimizes excessive extruder wear due to the filler.

In the conventional pre-extrusion process, the calcium carbonate filler is admixed directly with the PVC resin, for example, in bin 10, it is admixed with the other additives discussed above in, for example, bin 12, or it is stored separately in, for example, bin 14, as illustrated in the drawing. In any case, these three components, i.e., the PVC resin, the filler, and the remaining additives, are typically deposited at approximately the same time into a hot mixer 16, typically by means of air conveyance. A weight hopper 17 may be used to regulate the amount of resin entering the hot mixture and, of course, weight adjusting devices (not shown) may be used to regulate the amount of additives and filler to be deposited in the hot mixer.

One function of hot mixer 16 is, of course, to uniformly mix together the components making up the PVC mixture therein. Another function of the mixer is to work the PVC prior to extrusion so that it will more readily fuse during extrusion. Still another function of the hot mixer is to melt the low-melting-point wax lubricants, if any, in the mixture. Any suitable hot mixer known to those skilled in the art may be provided. A typical hot mixer utilized heretofore and presently being used is one which includes electrically driven mechanical agitation, which mechanical agitation by means of friction imparts heat to the PVC mixture. Heat provided by an external source may or may not be necessary, depending upon the type of mechanical agitation provided and mixture present.

In a typical pre-extrusion process, the PVC mixture, after being mixed in hot mixer 16 for a predetermined amount of time sufficient to provide the aforediscussed functions, is deposited into a cold mixer 18 by means of gravity if the cold mixer is directly below the hot mixer or by means of air conveyance if the cold mixer is in a remote location. In some cases, as illustrated in the drawing, some of the PVC resin making up the entire mixture is deposited directly into the cold mixer, by-passing hot mixer 16. In any event, the primary function of cold mixer 18 is to cool down the hot mixture while keeping the constituents making up the mixture uniformly dispersed. Like hot mixer 16, cold mixer 18 can be readily provided by those skilled in the art and may, for example, utilize mechanical agitation, less severe than that of hot mixer 16 so as not to heat the mixture.

From cold mixer 18, the PVC mixture is air-conveyed to the extruder (not shown) via one or more mixture storage bins 20. In this regard, it is to be understood that the present invention is not directed per se to the extrusion of polyvinyl chloride in the manufacture of PVC pipe. Hence, a description of the actual extrusion process will not be provided. It should suffice to state that those skilled in the art are fully familiar with such a process.

The discussion just provided related to a typical known pre-extrusion process. Certain points regarding this process should be noted before providing a detailed discussion of applicants' improvements to this process. As stated, the calcium carbonate filler is in particulate form and generally is substantially finer than that of the PVC resin. As also stated, the entire mixture is at least partially air-conveyed from one point to another until it is ultimately deposited into the extruder. As a result of both of these conditions, three distinct problems arise to which the present invention successfully addresses itself, as will be seen hereinafter.

First, because the filler is so fine and because the entire mixture is subject to air under pressure along portions of its travel, during air-conveyance, the filler tends to form clouds of dust and enters into the ambient surroundings at the junctures between the conveyance tubes and various bins. Second, these clouds of dust within the various bins, for example, composition on mixture storage bin 20, cause much of the calcium carbonate filler to be deposited along the internal sides of the container. Hence, at any given time, the PVC mixture deposited into the extruder may include less calcium carbonate filler than originally provided. As the calcium carbonate increasingly builds up around the internal wall of the container, it eventually tends to break up and fall into the mixture in large clumps. Hence, at any given moment, the PVC mixture may include too much calcium carbonate filler thereby adversely affecting the extrusion process and/or adversely affecting the physical characteristics of the ultimately produced pipe. In addition to these two problems, it has been found that much of the calcium carbonate making up these clouds of dust tends to deposit on vacuum filter screens provided in the storage bins. This deposited calcium carbonate requires the filter screens to be cleaned more often than in the case when the PVC mixture is calcium carbonate-free.

While some of the calcium carbonate may adhere, at least temporarily, to the PVC particle by means of the waxes, if any, the present invention is directed to reducing the problems just discussed by adhering most of the particles making up the calcium carbonate filler to some of the particles of PVC resin by utilizing a resin. As will be seen, this latter resin also promotes fusion of the PVC during extrusion. As the entire mixture is conveyed from one point to another in its travel to the extruder, most if not all of the calcium carbonate particles will remain substantially uniformly dispersed throughout the PVC particles.

In accordance with the pre-extrusion process of the present invention, the PVC resin, the various process and products additives described above, if any, and the filler are initially stored in separate containers, for example, bins 10, 12, and 14, respectively, as illustrated in the drawing. In order to promote adhesion between the calcium carbonate filler and PVC resin, storage bin 12 includes as one additive a resinous substance, in particulate form, which will hereinafter be referred to as a PVC-filler adhesion agent. This resinous adhesion agent is one which has a melting point below that of the PVC resin and one which, when initially heated to its melting point, will adhere to an adjacent polyvinyl chloride particle and an adjacent calcium carbonate particle but will not be quickly absorbed by these particles. A preferred PVC-filler adhesion agent is poly alpha methyl styrene resin sold by AMOCO Chemicals Corporation under the trade name AMOCO Resin 18. In one form, this resin has a melting point of 210° F and in another form has a melting point of 240° F, both being suitable for the present invention. The size of the particles making up this resin ranges from approximately 1/16 to 3/16 inch diameter, i.e., larger than both the PVC and filler. In this regard, it should be pointed out that the PVC resin has a softening point of between approximately 250° and 350° F, substantially higher than that of the AMOCO Resin 18.

It is to be understood that the present invention is not limited to the use of the AMOCO Resin 18 specifically set forth above. Other resins may be used. Others specifically found to be suitable, as will be seen, are (1) an ester of hydrogenated resin sold by Hercules Company under the trade name "Stabelite Ester 10" and (2) a resin derived from pine wood sold by Hercules Company under the trade name "Bresin No. 2." In any event, the adhesion agent chosen must be one which (1) has a lower meltng point than the melting point of the PVC resin, (2) it must be capable of adhering to the PVC resin and filler when initially melted without being immediately absorbed by the PVC or filler, and (3) is compatible with the extrusion process and, in fact, promotes fusion of the PVC resin during the extrusion process. With the aid of the present disclosure, one with ordinary skill in the art could readily select the particular resinous adhesion agent which would be most satisfactory.

The exact amount of adhesion agent utilized will depend in large part of the amount of filler used in the overall PVC mixture. For example, based on 100 parts by weight PVC resin, where between approximately 20 and 30 weight parts filler (per 100 weight parts PVC) is provided, between approximately 2 and 4½ weight parts resinous adhesion agent (per 100 weight parts PVC) has been found to adequately adhere the calcium carbonate filler to the PVC resin particles. In any event, a sufficient amount to adhere most and preferably all of the filler to the PVC must be provided.

Having provided the PVC-filler adhesion agent in storage bin 12, it is conveyed to hot mixer 16 along with any other additives which might be in bin 12 and with some or all of the PVC resin in storage bin 10. Note that the calcium carbonate filler in bin 14 is not added to the hot mixer at this time. Once the PVC resin, resinous adhesion agent, and other additives (if any) are deposited in hot mixer 16, they are mixed together and heated, preferably by mechanical agitation, until the resinous particles making up the PVC-filler adhesion agent reach the melting point, at which time these particles adhere to adjacent PVC particles.

Before these melted particles have a chance to be completely absorbed by the PVC, the calcium carbonate filler is deposited into the hot mixer and dispersed throughout the mixture therein. This causes the calcium carbonate particles to adhere to adjacent particles of melted resin and therefore to adhere to the PVC particles to which the melted particles are already attached as it filters through the PVC. At this time, before the melted particles are allowed to be absorbed by either the PVC or the filler, they are cooled down. This may be accomplished by external means but is preferably accomplished inherently by the addition of the filler into the hot mixer. More specifically, if a sufficient amount of calcium carbonate filler, for example, a minimum of 15 parts per 100 (based on 100 parts by weight of PVC) is used, the mere addition of the filler will cool down the entire mix and particularly the melted adhesion agent as it attaches to the melted particles. The mixing operation continues for a short time after the filler has been added to thoroughly mix the filler throughout the mixture but not long enough for the resinous adhesion agent to heat back up to its melting point.

As just stated, it is important that the calcium carbonate filler is not added before the PVC-filler adhesion agent reaches its melting point and yet it is important that it be added before the adhesion agent has a chance to be absorbed by the PVC. In acordance with a preferred embodiment of the present invention, hot mixer 16 includes electrically driven mechanical agitating means (not shown). The agitating means can be driven by, for example, an electric motor 25 using electric current. Power is supplied via conduit 27 to the motor from power supply 29 through ammeter 22. During mixing of the PVC resin and the resinous PVC-filler adhesion agent and before the adhesion agent begins to melt, the current to the motor required to drive the mechanical agitating means at a constant rate is fairly constant. Once the adhesion agent begins to melt, it imparts to the overall mixture increased resistance to the mechanical agitating means thereby causing the current required to drive the mechanical means at the same rate to increase sharply. Hence, by utilizing an ammeter, for example, ammeter 22, to monitor this current and by interlocking the ammeter with a suitable open-close valve 24 in the line between filler bin 14 and hot mixer 16, the calcium carbonate filler can be deposited within the hot mixer at precisely the time the current required to drive the mechanical agitating means increases, i.e., at about the time the adhesion agent begins to melt. Suitable components (not shown) to perform this function can be readily provided by those with skill in the art.

After depositing the filler material into the hot mixer and adhering the various particles making up this filler to the PVC particles in the manner just discussed, the entire mixture is mixed for a short time and by suitable control means (not shown), it is deposited into cold mixer 18, as illustrated in the drawing. From there the entire mixture goes to one or more mixture storage bins 20 and finally to the extruder, as is the case in heretofore utilized pre-extrusion processes. However, one difference between the present process and those utilized heretofore is that the calcium carbonate filler, which is adhered to the PVC, does not produce the dust, segregation, or filter maintenance problem discussed above to the degree discussed above.

Once deposited into the extruder, the mixture is extruded through various temperature zones by one or more extruder screws and eventually formed into the ultimate product, i.e., the pipe, at the extruder's die head and thereafter cooled. Since, as stated previously, the actual extrusion process is not per se a critical feature of the present invention, the extrusion process will not be described herein. One with ordinary skill in the art is quite familiar with this process. However, two points should be noted. First, it should be reiterated that the particular PVC-filler adhesion agent, the particular filler, and the remaining additives which are chosen to be included with the PVC resin when making up the overall PVC mixture must be chosen (1) to be compatible with one another, (2) to be compatible with the particular process of making the article from the mixture, i.e., the extrusion process, and (3) so as not to adversely affect the physical characteristics of the ultimately produced article, for example, extruded PVC pipe, for the intended use of the article.

As previously stated, one with ordinary skill in the art, in view of the disclosure herein, could readily determine what components of the overall PVC mixture would or would not meet these compatibility requirements. A second point which should be noted is that the resin adhesion agent, for example the preferred PVC-filler adhesion agent, i.e., the poly alpha methyl styrene sold under the trade name AMOCO Resin 18, in addition to acting as a PVC-filler adhesion agent, functions in an additional way. Specifically, the adhesion agent functions as an extrusion processing aid in that it promotes fusion of the PVC resin in the extruder. This is especially advantageous in view of the fact that the calcium carbonate filler acts as a dry lubricant in the extruder until it is absorbed by the PVC and, hence, initially reduces the amount of work that the extruder can do on the PVC during the early extrusion stages. Where this is the case, a substance to combat this situation, i.e., a substance which will promote early fusion of the PVC in the extruder, may be required. By utilizing a PVC-filler adhesion agent which will also fulfill this function means that an additional constituent to accomplish this may not be necessary.

The present invention has been described as it relates to a pre-extrusion process in the manufacture of extruded PVC pipe. As described, this process included separate storage of the PVC resin, separate storage of the additives other than the filler but including the PVC-filler adhesion agent, and separate storage of the filler before these components are introduced into the hot mixer. It is to be understood that the adhesion agent and other additives (if any) other than the filler could be precombined with the PVC resin in a separate process and further, the particulate filler could be preadhered to the PVC resin by means of a suitable PVC-filler adhesion agent in a separate process.

The exact amount of resin-filler adhesion agent in any given mixture will depend upon a number of factors, including the amount of resin and filler in the mixture and the intended use of the ultimate extruded product. For example, where the mixture is to be used in manufacturing extruded PVC sewer pipe, it has been found that between approximately 2 and 4½ parts by weight PVC-filler adhesion agent to 100 parts by weight PVC was found desirable when the overall mixture included 30 parts calcium carbonate filler to the 100 parts PVC. However, the adhesion agent also functions as a PVC fusion promoter in the extruder and, hence, there should be a sufficient amount of this substance to perform the functions of the present invention, i.e., to adhere the filler to the PVC resin and also to promote fusion.

It should be obvious that where a filler is provided to extend the resin constituting the major component of the ultimately produced article, it is desirable to include as much filler as possible so long as a satisfactory product can be produced. Hence, if less than, for example, 30 parts filler is combined with 100 parts resin, less than 2 to 4½ parts adhesion agent may be required in combining the filler and resin. In any event, one with ordinary skill in the art in view of the present disclosure could readily determine the necessary amount of adhesion agent required depending upon the other constituents in the mixture, the amounts of these other constituents and the ultimate use of the mixture.

An experiment was made to compare the calcium carbonate to PVC adhesion capabilities of various resins, specifically the preferred "AMOCO 18" resin, the "Stabelite Ester 10" and "Bresin No. 2" resins referred to above, and another pinewood derived resin sold by Hercules Company under the trade name "Vinsol". In this experiment, five batches of material were prepared. Each batch included 100 parts by weight PVC in particulate form as well as equal amounts of standard extrusion aids such as, for example, waxes. Each of four of the five batches included 3 parts adhesion agents, specifically the resins referred to above. The fifth batch did not include any adhesion-agent at all. None of the batches initially included filler, specifically calcium carbonate.

Each of the four batches including adhesion agents was hot mixed in the manner described above. At the point when the resin agent initally melted, 30 parts calcium carbonate was introduced therein and mixed throughout the batch whereupon the overall mixture was cooled. The batch not including adhesion agent was also hot mixed and 30 parts calcium carbonate was introduced after approximately the same amount of hot mixing time as that of the other batches. Equal samples were taken from the five mixed batches and give a 200 mesh screen analysis to determine what percentage of material in each sample smaller than 200 mesh would pass through the screen. Since the calcium carbonate was the only particulate material which when initially introduced in the batches were this small, this analysis indicated the percentage of calcium carbonate which was not adhered to the PVC. The percentage results are set forth in TABLE I below.

Further samples from the five batches were given standard Brabender fusion and torque tests to determine whether the sample mixtures would fuse in the extrusion of the material into ultimate products. As can be seen in TABLE I below, the samples with "AMOCO 18" resin, "Stabelite Ester 10" resin and "Bresin No. 2" resin fused displaying 175° C flux times of 4 minutes, 15 minutes and 10 minutes respectively. The sample with "Vinsol" resin and the batch with no adhesion agent did not fuse at all within the time alloted, i.e., 30 minutes. From still further samples, 9 inch square sheets ⅛ inch thick were made by first working the sample into sheet form and then compression molding these preliminary sheets into the final squares. These squares were subjected to standard impact and tensile strength tests. The results of these tests are also set forth in TABLE I.

TABLE I

| RESIN ADHESION AGENT | −200 Mesh Particles (% by dry wt.) | Impact (inch-lbs/ inch of notch) | Tensil (PSI) | 175° C Flux Time (minutes) |
|---|---|---|---|---|
| AMOCO 18 | 10.8 | 1.71 | 6,061 | 4 |
| STABELITE ESTER 10 | 6.0 | 1.45 | 5,842 | 15 |
| BRESIN NO. 2 | 7.5 | 1.44 | 5,648 | 10 |
| VINSOL | 13.5 | 1.23 | 5,968 | No Fusion in 30 minutes |
| NO AGENT | 16.0 | 1.74 | 5,682 | No Fusion in 30 minutes |

TABLE I, indicates that the first three resin agent increase the percent adhesion between the calcium carbonate and PVC as compared to samples with no adhesion agent. While the STABELITE ESTER 10 and BRESIN No. 2 resins appear to be more efficient in adhering the calcium carbonate than the AMOCO 18 resin, the latter appears to be more efficient in fusion promotion. It should be noted that even with no adhesion agent, adhesion between the PVC and calcium carbonate did take place. It is believed that this is at least in part due to the waxes in the sample. However, the increase in adhesion using the agents are significant in reducing the problems discussed previously. Also note from the table that the first three resins do promote fusion whereas the sample without an adhesion agent and the sample with VINSOL resin did not promote fusion.

It is to be understood that the experiments set forth above and results recited in TABLE I are not intended to limit scope of the present invention.

What we claim is:

1. In a method of making an extruded resin article, which method includes preparing a mixture including a first resin in particulate form with a non-resinous filler material in finer particulate form dispersed throughout said resin, air-conveying said mixture to the point at which the article is to be made from a remote location and making said article from said mixture by means of extrusion, the improvement comprising:
   a. providing a second resin in particulate form, said second resin being such that
      i. it has a melting point below that of said first-mentioned resin,
      ii. when initially heated to its melting point, said second resin will adhere to adjacent particles of said first-mentioned resin and filler material but will not be immediately absorbed by said adjacent particles, and
      iii. said second resin promotes fusion of said first resin during said extrusion;

b. substantially uniformly mixing said particles of second resin throughout said particles of first resin prior to combining said filler material with said first resin to provide a substantially homogeneous mixture of the two;
c. during said mixing step, heating said resins to the point at which said second resin initially melts such that the particles of second resin adhere to particles of the first resin;
d. after said second resin has reached said melting point and before it has a chance to be completely absorbed by said first resin, dispersing said filler material substantially throughout said first and second resins such that the particles of filler material adhere to said second resin particles; and
e. preventing said melted particles of second resin from being completely absorbed by said first resin particles or particles of filler material.

2. The improvement according to claim 1 wherein said step of preventing said particles of second resin material from being absorbed consists essentially of adding a sufficient amount of said filler material to said homogeneous mixture to cool down said resins before said second resin has a chance to be absorbed.

3. The improvement according to claim 2 wherein said mixture of first resin particles and second resin particles is provided by using electrically driven mechanical means such that the amperage required to drive said means at a constant rate remains substantially constant until said second resin material reaches said melting point and then increases at said melting point, said method including:
   a. monitoring said amperage, and
   b. at the point at which said amperage increases, initiating said step of dispersing said filler material in said mixture of first and second resins.

4. The improvement according to claim 1 wherein said first-mentioned resin is polyvinyl chloride.

5. The improvement according to claim 4 wherein said second resin is a styrene resin.

6. The improvment according to claim 5 wherein said second resin is a poly alpha methyl stryene resin.

7. The improvement according to claim 6 wherein said resins are heated to a temperature of between approximately 210° F and 240° F.

8. The improvement according to claim 6 wherein said filler material is calcium carbonate.

9. The improvement according to claim 8 wherein said first-mentioned resin is polyvinyl chloride.

10. The improvement according to claim 1 wherein said homogeneous mixture includes a wax material having a melting point below that of said first resin and wherein the point at which said second resin melts is above the melting point of said wax material.

* * * * *